United States Patent
Settje et al.

(10) Patent No.: US 6,930,853 B2
(45) Date of Patent: Aug. 16, 2005

(54) ADAPTIVE SEEK CONTROL FOR MAXIMUM PERFORMANCE WITH MINIMAL FILTER CORRUPTION

(75) Inventors: Chris Thomas Settje, Westminster, CO (US); Frank William Bernett, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 480 days.

(21) Appl. No.: 10/086,163

(22) Filed: Oct. 18, 2001

(65) Prior Publication Data

US 2002/0163753 A1 Nov. 7, 2002

Related U.S. Application Data

(60) Provisional application No. 60/284,471, filed on Apr. 17, 2001.

(51) Int. Cl.[7] ................................................ G11B 5/596
(52) U.S. Cl. ................................ 360/78.04; 360/78.06
(58) Field of Search .......................... 360/69, 75, 78.01, 360/78.04, 78.06, 78.07, 78.09, 77; 318/621, 568.22

(56) References Cited

U.S. PATENT DOCUMENTS

| | | | |
|---|---|---|---|
| 4,516,177 A | 5/1985 | Moon et al. ................. 360/77 |
| 4,697,127 A | 9/1987 | Stich et al. ................. 318/561 |
| 4,914,644 A | 4/1990 | Chen et al. .................. 369/43 |
| 5,119,250 A | 6/1992 | Green et al. ............. 360/78.06 |
| 5,369,345 A | * 11/1994 | Phan et al. ................. 318/561 |
| 5,684,653 A | 11/1997 | Knowles .................. 360/78.04 |
| 6,088,188 A | 7/2000 | Serrano et al. .......... 360/78.09 |
| 6,101,058 A | 8/2000 | Morris ........................ 360/69 |
| 6,148,240 A | 11/2000 | Wang et al. .................. 700/63 |
| 6,163,430 A | 12/2000 | Hansen ..................... 360/78.06 |
| 6,178,060 B1 | 1/2001 | Liu .......................... 360/78.07 |
| 6,246,536 B1 | 6/2001 | Galloway ................ 360/78.04 |
| 6,256,163 B1 | 7/2001 | Schmidt et al. .......... 360/78.09 |

* cited by examiner

*Primary Examiner*—David Hudspeth
*Assistant Examiner*—Jason Olson
(74) *Attorney, Agent, or Firm*—David K. Lucente; Derek J. Berger

(57) ABSTRACT

By dynamically adjusting the maximum voice coil motor driving current produced by an amplifier in a disc drive, amplifier saturation may be reduced, while still maintaining optimal current to quickly drive the voice coil motor during seek operations. Reducing disc drive saturation, and thus non-linearities in the driving current, increases notch filter performance. As the notch filter is used in the disc drive to remove frequencies from the driving current that tend to cause or excite the mechanical oscillations in the disc drive, increased notch filter performance reduces mechanical oscillations and improves disc drive noise characteristics.

26 Claims, 6 Drawing Sheets

ADAPTIVE SEEK CONTROL FOR MAXIMUM PERFORMANCE WITH MINIMAL FILTER CORRUPTION

RELATED APPLICATIONS

This application claims priority of U.S. provisional application Ser. No. 60/284,471, filed Apr. 17, 2001.

FIELD OF THE INVENTION

This application relates generally to data storage devices and more particularly to optimizing seek performance in a data storage device.

BACKGROUND OF THE INVENTION

Modern hard disc drives comprise one or more rigid discs that are coated with a magnetizable medium and mounted on a hub of a spindle motor for rotation at a constant high speed about a rotational axis. Information is stored on one or more surfaces of the disc or discs in a plurality of concentric circular tracks. An aggregate of tracks on the surfaces of a disc or discs at a given radial position from the rotational axis is referred to as a cylinder. Data is written to, and read from, the tracks via transducers ("heads") mounted to a radial actuator, which positions the heads relative to the discs.

Typically, such radial actuators employ a voice coil motor (VCM) to position the heads with respect to the disc surfaces. Normally, the VCM includes a coil mounted on the side of the actuator body opposite an array of permanent magnets which are held above and/or below the coil on upper and/or lower magnet plates, respectively. When a controlled current is passed through the coil, a magnetic field is generated. The generated electromagnetic field interacts with the magnetic field of the permanent magnets thus causing the coil to move relative to the magnets. As the coil moves, the actuator body pivots about the pivot shaft and the heads are moved across the disc surfaces.

A closed-loop servo system is typically used to control the position of the heads with respect to the disc surfaces. More particularly, during a track seek operation, a servo controller in the servo system receives the address of the destination track and generates a position signal, which is amplified by a transconductance amplifier and presented to the coil of the VCM as a driving current. The driving current causes the actuator, and thus the head, to initially accelerate and then subsequently decelerate as the head nears the destination track. At some point towards the end of the deceleration of the head, the servo system will transition to a settle mode during which the head is settled onto the destination track and, thereafter, the servo system causes the head to follow the destination track in a track following mode.

During the track following mode, servo information is read that provides a position error signal indicative of the position of the head relative to a center line of the track. The position error signal is used, when necessary, by the servo controller to generate a correction signal that in turn is provided to the amplifier. The transconductance amplifier then amplifies the signal and presents the amplified signal to the coils as a driving current. The driving current then causes then adjust the position of the actuator to correct the position of the head relative to the track.

Generally, the objective of a typical seek operation has been to move the head from the initial track to the destination track in a minimum amount of time (access time). In order to move the head to the destination track in the minimum amount of time, the transconductance amplifier is typically driven into saturation. This assures that a near maximum driving current is passed through the coils and, thus, that a near maximum acceleration occurs to move the heads to the desired track. However, due to fluctuations in the voltage supplied to the transconductance amplifier, coil resistance variations, and back-EMFs generated as the coil passes through the magnetic field, the maximum voltage presented to the transconductance amplifier varies significantly over time. As such, maximum drive current, and thus maximum acceleration, is often not achieved.

As described, a disk drive mechanical structure is composed of multiple mechanical components. Each of these components has various resonant modes that if excited by an external energy source will cause the component to physically move at its natural frequencies of oscillation. If the component is highly undamped (i.e. the resonance is high amplitude, narrow frequency band) it will tend to oscillate with a minimal external driving energy. This oscillation adds to the oscillation in the disc drive, eventually resulting in physical actuator motion and, thus, the data head. Motion in the head causes seek settle problems, off track errors, and potential fly height problems. Additionally, the component oscillations also typically create acoustical noise. These oscillations are often referred to as "resonances."

As mentioned above, typical disc drives produce a driving current through a voice coil motor (VCM) to drive the data head to the desired position. When a frequency spectrum of driving current is analyzed it is found that the spectrum is composed of frequency components from direct current (DC) all the way up to multiple kilohertz (kHz). If driving current is driving the actuator at the same frequency as the resonant mode of a mechanical component, the energy may be sufficient to excite the mechanical component into oscillation. This is very undesirable and will at least degrade disc drive performance or at worst will cause the servo system to go unstable.

To obtain optimal disc drive performance and acoustic characteristics, it is necessary to reduce or minimize resonances in the mechanical components of the disc drive. One way of doing this is to limit the excitation energy at the natural frequency of oscillations of the mechanical components.

One method typically employed to minimize the mechanical oscillation of this type involves the use of hardware electronic filtering and/or digital filtering of the VCM current via a microprocessor or digital signal processor. Both types of filtering achieve the same overall result; they reduce the driving force energy (i.e. the driving current flowing) at frequencies deemed a concern.

One type of filter that is widely used to remove driving energy at the various resonant modes of the components of a disc drive is known as a notch filter. A notch filter is a band-rejection filter that produces a sharp notch in the frequency response curve of driving current from the amplifier. When a notch filter is activated by the servo control loop, the open loop response ends up a summation of the original response plus the notch filter response. If the notch filter is centered about the frequency where the peak amplitude of the mechanical resonance occurs, then the driving current from the transconductance amplifier at this frequency can be reduced so that there will be little or no energy made available to excite the mechanical structure.

However, while notch filters are typically effective at reducing unwanted frequencies in portions of the track seek operation where the characteristics of the transconductance amplifier are linear and predictable, notch filters are ineffective in those portions of the seek operation where the characteristics of the transconductance amplifier are non-linear, such as when the transconductance amplifier goes into saturation. As such, as currently employed in disc drives, notch filters are ineffective at reducing driving force energy caused by frequencies occurring when the transconductance amplifier is in saturation.

SUMMARY OF THE INVENTION

Against this backdrop the present invention has been developed. In general, various embodiments of the present invention described herein relate to increasing disc drive performance characteristics by reducing mechanical oscillation within the disc drive. These mechanical oscillations may be reduced by optimizing operations of a notch filter or filters used in the disc drive's servo control loop during seek operations to remove certain frequencies from a driving current that tend to cause or excite the mechanical oscillations in the disc drive. One technique for optimizing notch filter operation is by dynamically reducing or limiting the time an amplifier that produces the driving current is saturated, as notch filters are typically effective only when the characteristics of the amplifier are linear and predictable.

One embodiment of the present invention relates to a method for optimizing seek operations in a disc drive, and thus allowing optimal notch filter response, having an amplifier for supplying a driving current to drive a voice coil motor. In this embodiment, the driving current supplied to the voice coil motor is limited to a maximum driving current. The steps of the method in this embodiment include determining whether the amplifier saturated during a portion of a seek operation and, if the amplifier saturated during the portion of the seek operation, reducing the maximum driving current that may be produced by the amplifier.

Another embodiment relates to a system for optimizing notch filter operation in a disc drive having a voice coil motor, an amplifier for supplying a driving current to the voice coil motor, and a notch filter for removing unwanted frequencies from the driving current. In this embodiment, the disc drive further includes a driving current adjustment means for dynamically defining, during drive operation, a maximum driving current supplied by the amplifier, so as to limit the amount of time the amplifier is saturated.

These and various other features as well as advantages which characterize the present invention will be apparent from a reading of the following detailed description and a review of the associated drawings.

DETAILED DESCRIPTION

In general, the present disclosure describes methods and systems for optimizing seek performance in a data storage device. More particularly, the present disclosure describes embodiments of a current control module which utilize a unique scheme to keep an amplifier close to, but not exceeding, saturation so that optimal seek performance may be achieved. More particularly still, the present disclosure describes a current control module for controlling saturation in a transconductance amplifier, so that maximum notch filter effectiveness and noise reduction may be achieved.

Figure 1:
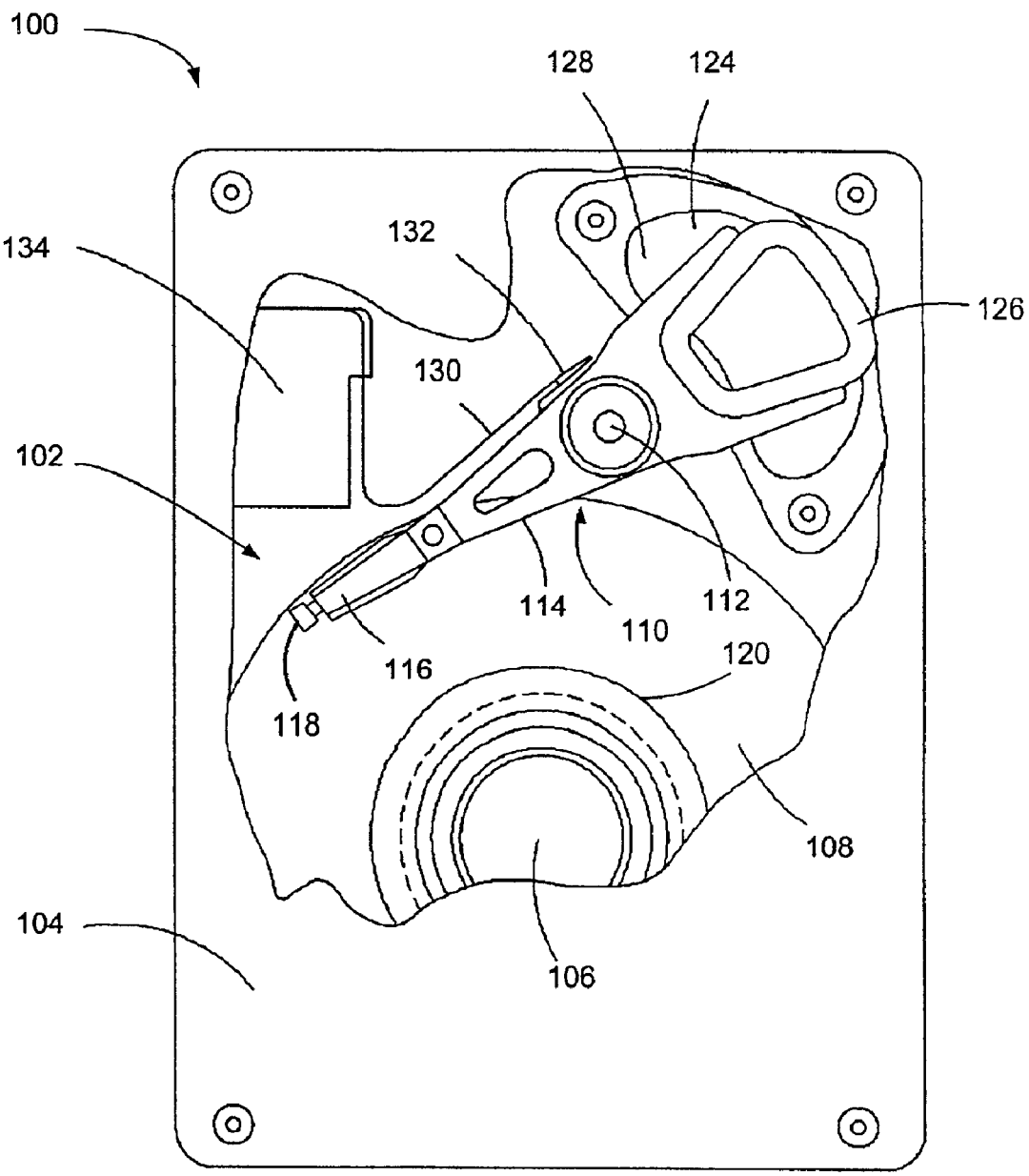
FIG. 1 is a plan view of a disc drive incorporating an embodiment of the present invention.

A disc drive 100 incorporating an embodiment of the current control module of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks 120 on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of a driving current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100. The disc drive 100 further includes a drive controller 210 (FIG. 2) which is operable to be coupled to a host system or another controller that controls a plurality of drives. In an illustrative embodiment, the drive controller 210 is a microprocessor, or digital signal processor. The drive controller 210 is either mountable within the disc drive 100, or is located outside of the disc drive 100 with suitable connection to the actuator assembly 110.

Figure 2:
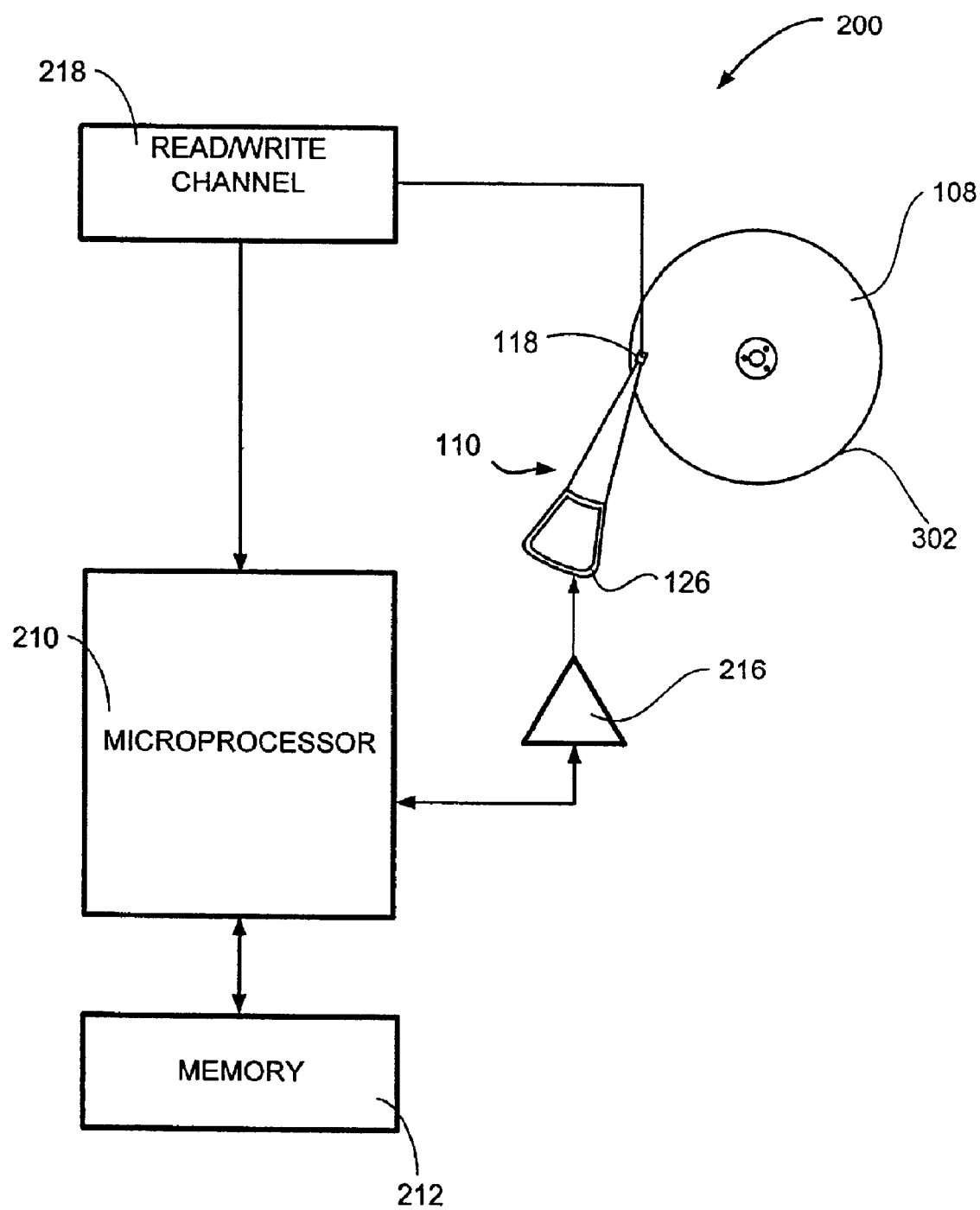
FIG. 2 is a simplified functional block diagram a functional block diagram a servo loop of the disc drive shown in FIG. 1.

Referring now to FIG. 2, shown therein is a functional block diagram of what is commonly referred to as the servo loop 200 of the disc drive 100. In general, the servo loop 200 includes a disc drive microprocessor 210 having an associated memory 212, a transconductance amplifier 216, the actuator assembly 110, and a read/write channel 218. In operation, the microprocessor 210 typically receives a seek command from a host computer (not shown) that indicates that a particular track 120 on the discs 108 is to be accessed. In response to the seek command, the microprocessor 210 determines an appropriate velocity or seek profile to move the head from its current position to the track that is to be accessed. The seek profile is then sent to the transconductance amplifier 216 for amplification. The transconductance amplifier 216 then provides a driving current corresponding to seek profile to the coil 126. In response to the driving current, the actuator assembly 110 accelerates toward the target track and then decelerates and stops the actuator assembly 110 when the head 118 is over the target track and the seek operation is completed.

In one embodiment, for a given seek command, the microprocessor 210 computes a seek profile comprising various steps, referred to herein as servo states. In this embodiment, the seek profile includes five servo states. A first "start move" state provides the appropriate signal to start the actuator moving towards the desired track. A second "constant acceleration" state provides the appropriate signal to drive the actuator through the constant acceleration portion of the seek. A third "velocity profile/square root" state provides the appropriate signal for controlling the actuator velocity to a predefined profile. A fourth "linear" state provides the appropriate signal to drive the actuator through the linear portion of the seek. Finally, a fifth "settle" state provides the appropriate signal for controlling the final "settling" of the actuator, and thus the head, in position over the desired track. That is, the settle state provides the appropriate signal to transition the actuator from track seeking to track following. It will be understood to one skilled in the art that the precise number, nomenclature, and/or function of each of the states in a seek profile may vary from one disc drive to another and/or from one manufacturer to another. As such, it will be understood that the five-state seek profile described herein is but one example of a possible seek profile that may be used in conjunction with the present invention.

Figure 3:
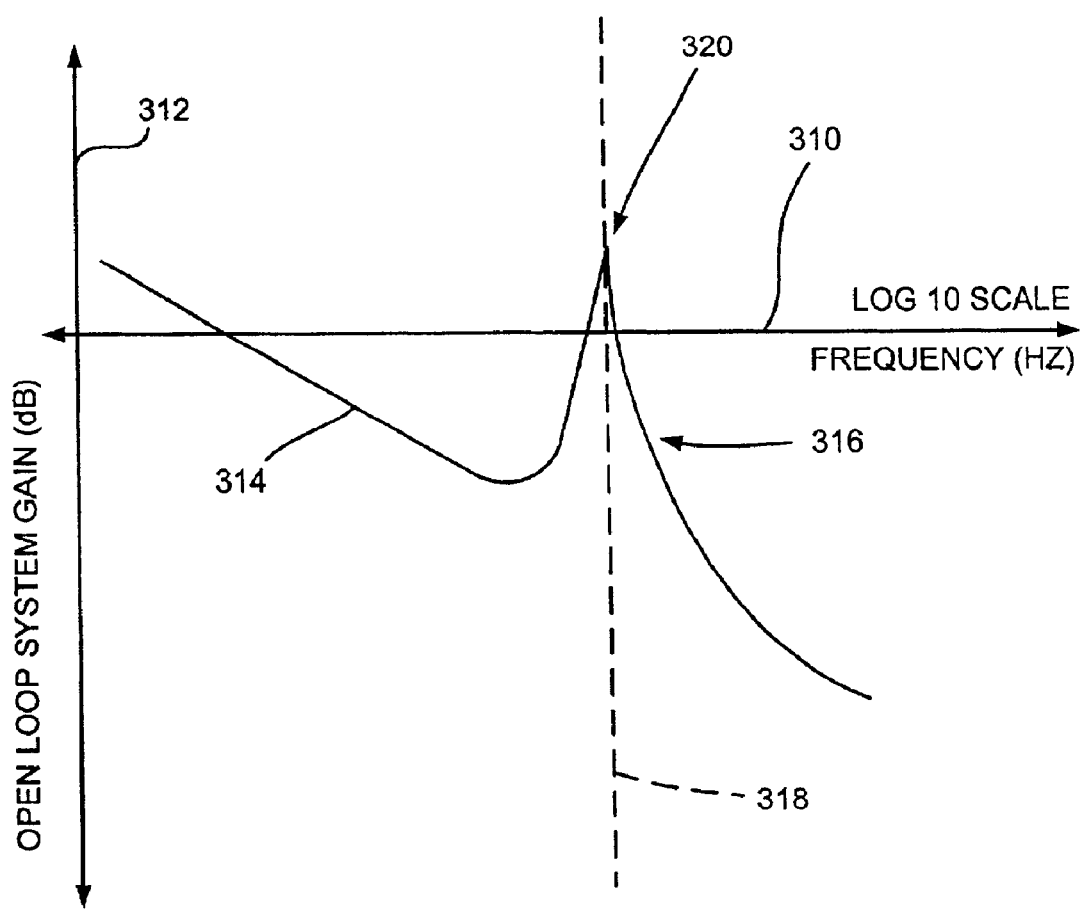
FIG. 3 is a bode plot showing mechanical resonance in a disc drive.

As is typical, each of the mechanical components of the disc drive 100 may have various resonant modes that, if excited by an external energy source, will cause the mechanical components to oscillate at the natural resonance frequencies of the component. FIG. 3 illustrates an open loop Bode plot 300 showing a mechanical resonance in a disc drive. For clarity, the phase information has been removed from the Bode plot 300 and the plot is not shown to scale. The x-axis 310 represents the frequency of the excitation energy, while the y-axis 312 represents the open loop system gain in decibels (dB). The open loop system gain 314 generally drops at the rate of 20 dBs per decade. However, as shown in FIG. 3, a mechanical resonance causes a sharp increase 316 in the system gain. The increase 316 in the system gain caused by the mechanical resonance depicted is centered at a center frequency 318 and has a peak amplitude 320.

Figure 4:
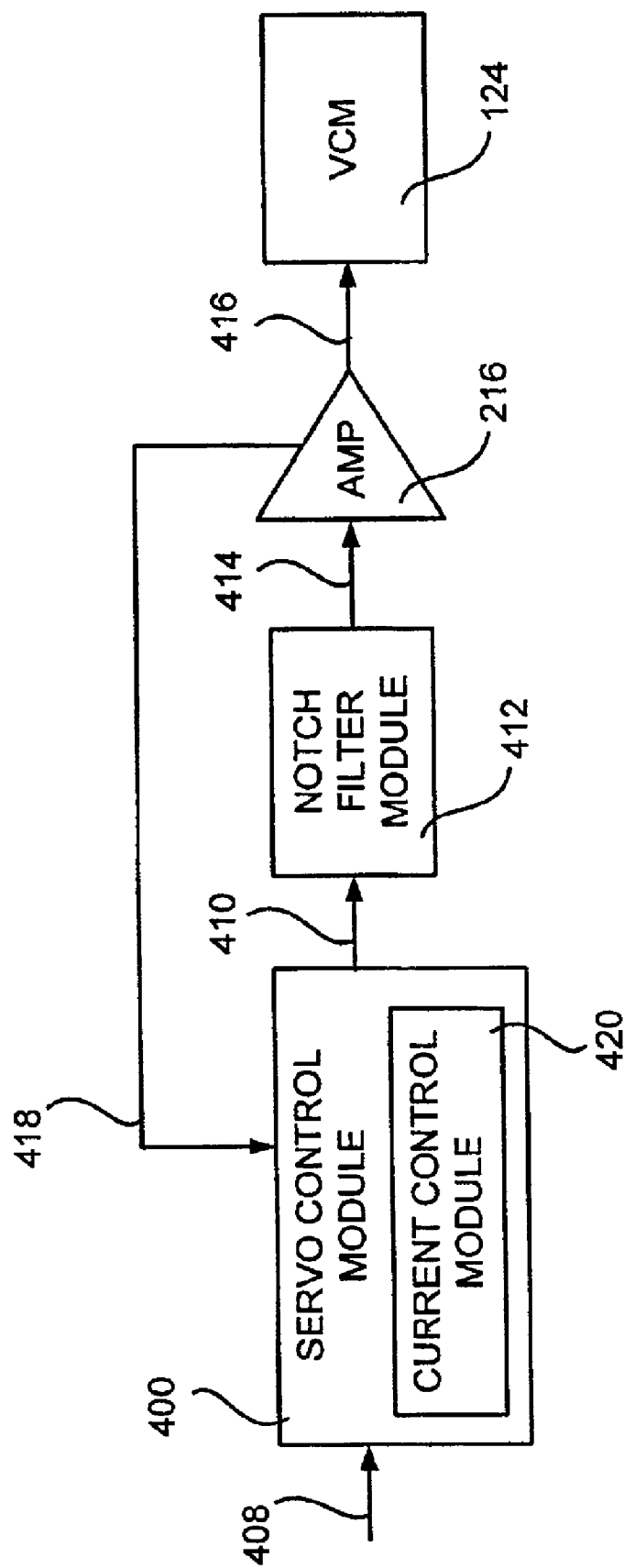
FIG. 4 illustrates a portion of the servo loop shown in FIG. 2.

FIG. 4 illustrates a simplified block diagram of the operational environment of a servo control module 400 according to an illustrative embodiment. In this embodiment, and other embodiments described herein, the logical operations of the servo control module 400 may be implemented as a sequence of computer implemented steps or program modules running on a microprocessor, such as, microprocessor 210. It will be understood to those skilled in the art that the servo control module 400 may also be implemented as interconnected machine logic circuits or circuit modules within a computing system. Additionally, the servo control module may be implemented in a separate component of the disc drive, such as a dedicated servo controller. The implementation is a matter of choice dependent on the performance and design requirements of the disc drive. As such, it will be understood that the operations, structural devices, acts, and/or modules described herein may be implemented in software, in firmware, in special purpose digital logic, and/or any combination thereof without deviating from the spirit and scope of the present invention as recited within the claims attached hereto.

Furthermore, the various software routines or software modules described herein may be implemented by any means as is known in the art. For example, any number of computer programming languages, such as "C", "C++", Pascal, FORTRAN, assembly language, Java, etc., may be used. Furthermore, various programming approaches such as procedural, object oriented or artificial intelligence techniques may be employed.

In this embodiment, the computer implemented steps that comprise the operations of the servo control module 400 are stored in some form of computer readable media. As used herein, the term computer-readable media may be any available media that can be accessed by a processor or component that is executing the functions or steps of the servo control module 400. By way of example, and not limitation, computer-readable media might comprise computer storage media and/or communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computer or processor which is executing the operating code.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product. In an exemplary embodiment, the computer readable-media that contains the functions or steps of the servo control module 400 is the memory 212, shown in FIG. 2.

As shown in FIG. 4, in a typical seek operation, the servo control module 400 receives a seek command 408 and generates, in response, a seek profile signal 410 composed of frequency components that range from direct current (DC) to multiple kilohertz or higher. The seek profile signal 410 is provided to a notch filter 412, which reduces the frequency components in the signal that are at or near the resonance frequencies of the disc drive mechanical structure. The notch filter 412 then provides a filtered signal 414 to the transconductance amplifier 216. The amplifier then provides a driving current 416 to the coil 126 of the actuator VCM 124 to position the head 118 at the desired location over the disc with reduced risk of exciting the disc drive mechanical structure into oscillation.

Figure 5:
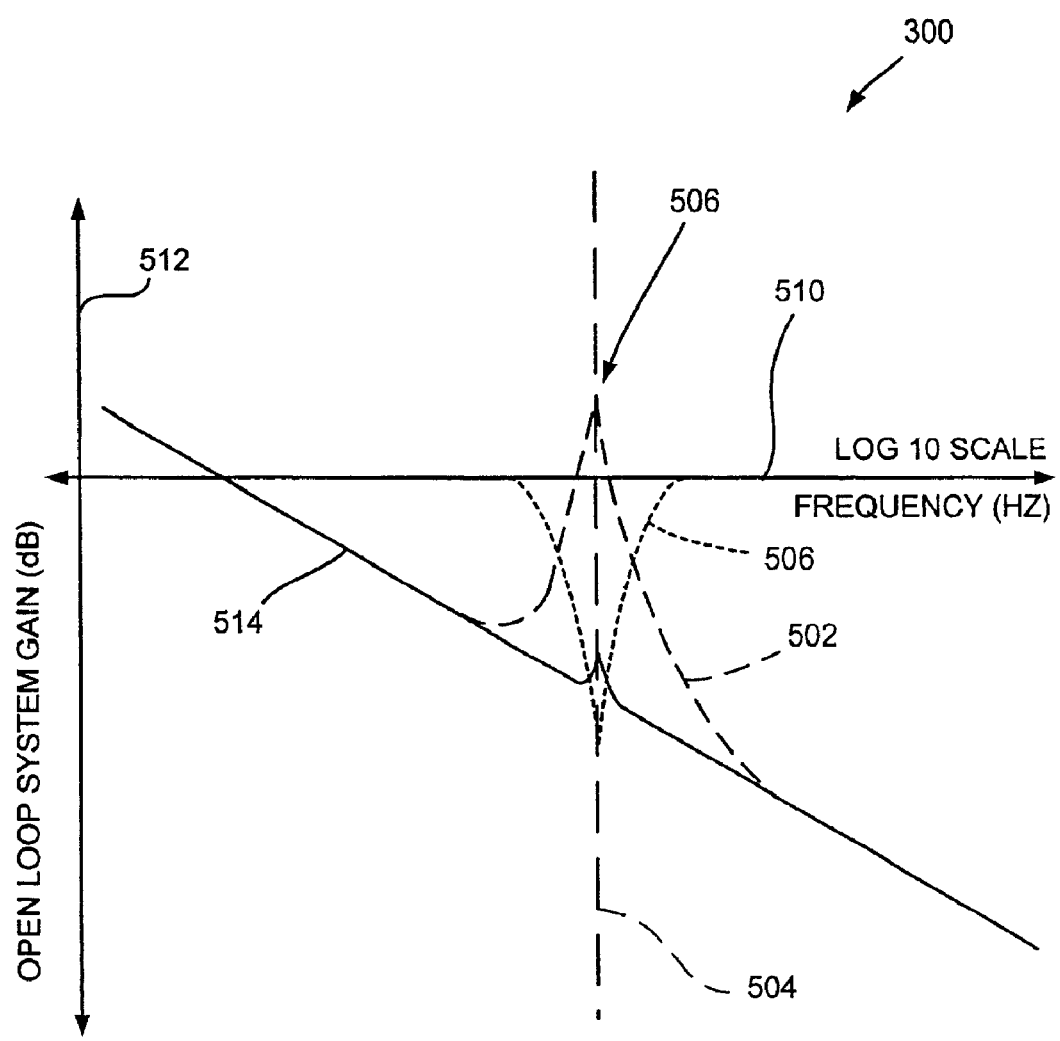
FIG. 5 is a bode plot showing the affects of a notch filter on the mechanical resonance shown in FIG. 3.

The effect of notch filter 412 can be seen in the Bode plot of FIG. 5, which for clarity's sake does not show the phase response and is not shown to scale. The x-axis 510 represents the frequency of the driving energy, while the y-axis 512 represents the system gain in decibels (dB). FIG. 5 shows a mechanical resonance 502 centered at center frequency 504. Also shown is the frequency response 506 of the notch filter 412. It can be seen that notch filter 412 appreciably attenuates the driving energy about the mechanical resonance 502, with the maximum attenuation occurring at the center frequency 504 of the mechanical resonance. FIG. 5 further shows the open loop frequency response 514 with the notch filter 412 active. When the notch filter 412 is activate, the open loop response 514 is a summation of the original response and the notch filter module response. That is, the notch filter works on the principle of superposition. It can be seen that the peak amplitude 512 at center frequency 504 is now well below 0 dB. When the notch filter response 506 is properly centered, as in FIG. 5, the driving force energy at the center frequency 504 of the mechanical resonance 502 can be reduced so that there will be little or no energy made available to excite the mechanical structure. It will be understood that the notch filter 412 may be used to eliminate a number of resonances in the disc drive 100

Various methods of implementing a notch filter 412 are known in the art and may be used and may be used with respect to this embodiment. One illustrative method of implementing a notch filter is to employ a bilinear transfer function of the form:

$$G(z) = \frac{B_0 + B_1 z^{-1} + B_2 z^{-2}}{1 - A_1 z^{-1} - A_2 z^{-2}},$$

Where G is the gain of the filter, z is the sampling rate of the servo system, and $A_1$, $A_2$, $B_0$, $B_1$, and $B_2$ are notch filter constants describing the frequency, depth, and width of the notch. These constants may be predetermined before the manufacture of the disc drive. Alternatively, these constants may be determined experimentally during the manufacture of the disc drive.

It should be noted, that the notch filter 412 is only effective at reducing unwanted frequencies in portions of the track seek operation where the characteristics of the transconductance amplifier 216 are linear and predictable. As such, the notch filter 412 will not function properly when the transconductance amplifier 216 is in a saturation state, where the characteristics of the transconductance amplifier 216 are no longer linear. However, to achieve desired performance requirements, the heads 118 of the disc drive 100 should reach the destination track in as little time as possible. Therefore, in order to move the head to the destination track in the minimum amount of time, while still allowing for a rapid seek time, the transconductance amplifier 216 should be driven up to, but not exceeding, the saturation point of the transconductance amplifier 216. This assures that the maximum driving current is passed through the coils 126 and, thus, that the maximum acceleration occurs in moving the heads to the desired track, while still allowing proper functioning of the notch filter 412.

To realize minimum seek times, while avoiding or minimizing the non-linearities that occur when the amplifier is in saturation, an embodiment of the present invention employs a current control module 420 in the servo control module (FIG. 4) to keep the transconductance amplifier 216 close to, but not exceeding, saturation. In general, the current control module 420 decreases the maximum output driving current allowed by the transconductance amplifier when a track seek operation pushes the transconductance amplifier into saturation and increases the maximum output current allowed by the transconductance amplifier when a track seek operation does not push the transconductance amplifier into saturation.

In one embodiment, the current control module 420 decreases the maximum driving current allowed by the transconductance amplifier during a track seek operation, when the read/write heads are being moved from one track to another. The current control module 420 then increases the maximum driving current allowed by the transconductance amplifier during a settle operation or during a track follow operation, when the read/write heads have arrived at a destination track. In this embodiment the current control module 420 preferably increases the maximum driving current allowed by the transconductance amplifier in increments that are smaller than the increments in which the current control module decreases the maximum driving current allowed by the transconductance amplifier. In this way, and through repeated operation of the current control module 420, an iterative approach is used to maintain the transconductance amplifier in a condition during maximum driving current output that is close to, but not exceeding, saturation.

Figure 6:
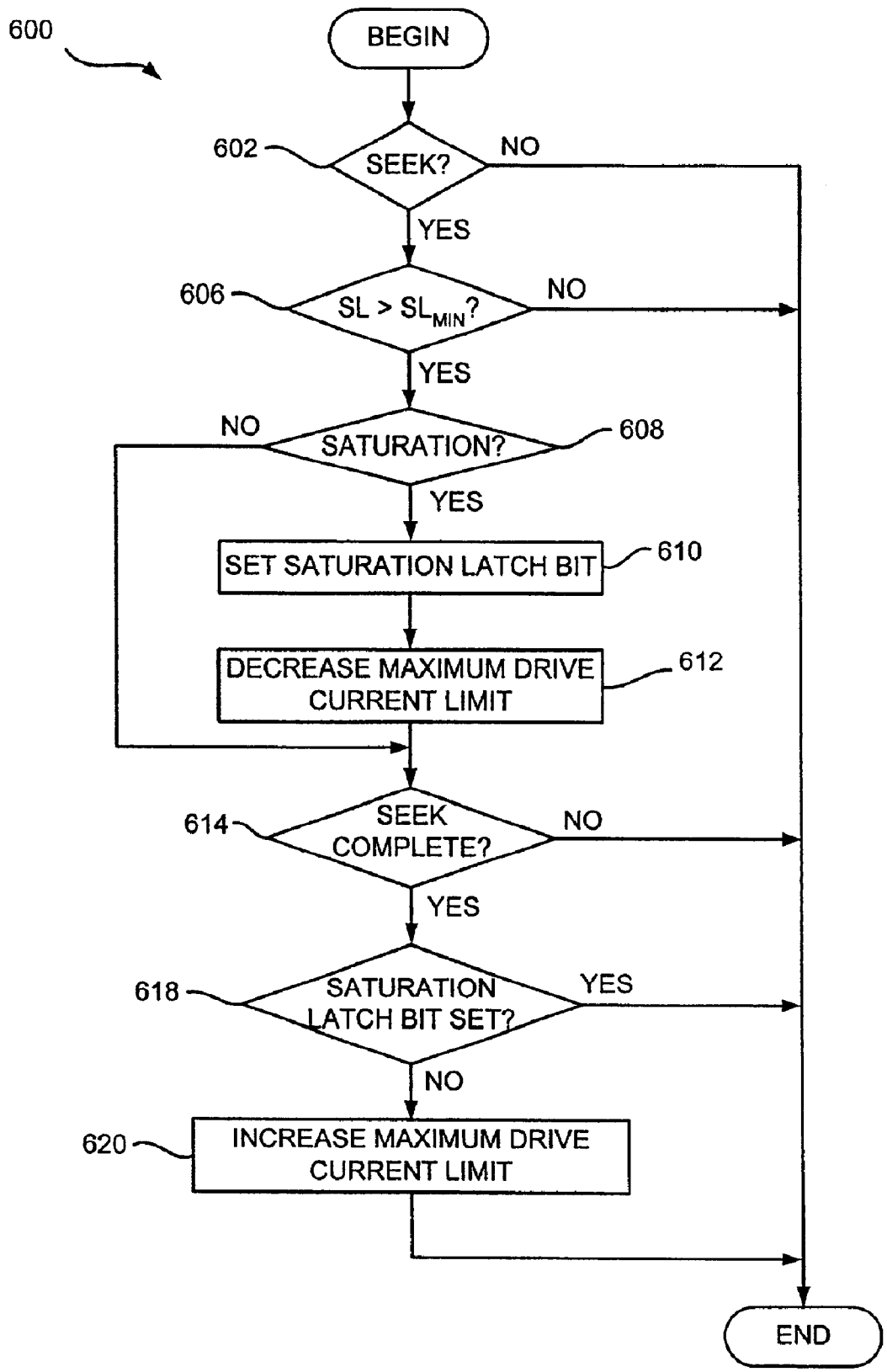
FIG. 6 is a general operation flow diagram illustrating the operations of an embodiment of a current control module employed in the disc drive shown in FIG. 1.

Turning now to FIG. 6, illustrated therein is an operational flow showing various operations that are executed by the servo processing module 408 during operation to optimize amplifier performance during track seek operations. In a preferred embodiment, the operational flow 600 shown in FIG. 6 will occur every time a servo sample is received by the servo processing module 408. In other embodiments the operational flow 600 may occur at various other times during the operation of the disc drive.

As shown in FIG. 6, upon the indication of the receipt of a servo sample, a track seek determination operation 602 determines whether a track seek operation, or a particular track seek state, is being requested or being performed. For example, as described above, in one embodiment, the disc drive includes five seek states: a first start move state, a constant acceleration state, a velocity profile/square root state, a linear state, and a settle state. In such an embodiment, determination operation may determine if a designated one or ones of the noted seek states are being requested or performed. In one embodiment, the track seek determination operation 602 determines if either the constant acceleration state, the velocity profile/square root state, or the linear state are being requested or performed. In other embodiments, the determination by the track seek determination operation 602 of whether a track seek is being requested or performed may be based on whether other track seek states are being requested or performed. Alternatively, the track seek determination operation 602 may simply determine if a track seek operation is being requested or performed, rather than a track follow operation.

If the seek determination operation 602 determines that a track seek operation, or a designated track seek state, is not requested or being performed, the operational flow 600 ends. If, on the other hand, the seek determination operation 602 determines that a seek operation or designated track seek state is requested or being performed, a seek length determination operation 606 then determines if a seek length (SL), is greater than a minimum seek length value ($SL_{MIN}$). In one embodiment, the seek length is defined as the distance between the cylinder where the heads of the disc drive are positioned before the current seek operation and the cylinder where the heads of the disc drive are positioned immediately following the current seek operation. Alternatively, if the seek operation is a designated track seek state, the seek length may be defined as the total track seek operation of which the designated track seek state is a part. The length of the seek operation may also be determined in other ways known in the art. The minimum seek length is a predetermined value that is indicative of the minimum seek length that will typically drive the amplifier into saturation. The minimum seek length may be determined experimentally or via computer simulations for a given disc drive or group of disc drives, such as a particular disc drive design or model. If the seek length determination to operation 606 determines that the length of the seek operation is not greater than the minimum seek length, the operational flow 600 ends. If the seek length determination operation 606 determines that the length of the seek operation is greater than the minimum seek length, a saturation determination operation 608 then determines if the transconductance amplifier 216 is in saturation.

The saturation determination operation 608 may determine whether the transconductance amplifier is in saturation in a number of ways. For example, many transconductance amplifiers 216 provide an indicator, such as an output signal or a set bit within the amplifier, that indicates that the amplifier is in saturation. In such a case, the saturation operation receives the signal or checks the bit to determine if the amplifier is in saturation. Alternatively, the determination operation 608 may determine if the amplifier is in saturation based upon a value of a head velocity error. The velocity error may be defined as the difference between the commanded head velocity and an estimated head velocity. When the head velocity error is greater than a predetermined threshold, then the transconductance amplifier 216 may be considered to be saturated. Additionally, the saturation determination operation 608 may determine if the amplifier is in saturation by other known means.

If the saturation determination operation 608 determines that the transconductance amplifier is not saturated, the operational flow 600 proceeds to determination operation 614, discussed in greater detail below. If the saturation determination operation 608 determines that the transconductance amplifier is saturated, a set operation 610 sets a saturation latch bit to indicate that the transconductance amplifier is in saturation. A driving current limit operation 612 then sets a limit on the maximum driving current that should be produced by the transconductance amplifier. As will be described, the driving current limit operation 612 acts to reduce the maximum driving current that will be produced by the transconductance amplifier in following seek or seek state operations. In this way, in a single execution of, or a number of successive operations of, the driving current limit operation 612, the maximum driving current produced by the transconductance amplifier will be reduced to a point that saturation of the transconductance amplifier is no longer occurring.

In one embodiment, the driving current limit operation 612 sets the maximum driving current according to the equation decreased_max_current=previous_max_current−K, where decreased_max_current is the new value of maximum driving current that is to be set by the driving current limit operation 612, previous_max_current is the previously set value of maximum driving current, and K is a constant. The value K is a simple numerical constant that may be determined, for example by experimentation, and set during manufacturing of the disc drive. The value K may then remain constant throughout the operational life of the disc drive. Alternatively, the value K may be dynamically adjusted during operational life of the disc drive.

In one embodiment, the driving current limit operation 612 sets a maximum current indicator within the transconductance amplifier that defines the maximum current that should be output by the transconductance amplifier. In this embodiment, the value of the maximum current indicator will preferably initially be set at a maximum value at the initialization of the disc drive. For example, the maximum current indicator may be set at the maximum number that may be represented by the number of bits available to store the maximum current indicator. During disc drive operation, the maximum current indicator will then be changed, when and if appropriate, by the current limit operation 612.

In alternative embodiments, the driving current limit operation 612 may limit the maximum driving current produced by the transconductance amplifier in other ways than by setting a maximum current indicator in the transconductance amplifier. For example, and without limitation, the driving current limit operation 612 may adjust future current profiles, such that a driving current is not demanded from the transconductance amplifier that would put the transconductance amplifier into saturation. In another alternative, the driving current limit operation 612 may use other mechanisms to keep the transconductance amplifier out of saturation, such as setting a limit for a slew rate limiter.

Following the driving current limit operation 612, a seek complete operation 614 will determine if seek operation is complete. In one embodiment, the seek complete operation 614 will determine if the entire seek operation is complete by comparing the position error and velocity error to predetermined thresholds. If both of the error signals are less than the predetermined threshold for a predetermined number of samples, the seek is deemed complete. That is, the seek complete operation 614 will determine a complete seek from one track to another is complete. In another embodiment, the seek complete operation 614 may determine if a specified track seek state is complete. If the seek complete operation 614 determines that the seek operation is not complete, the operational flow 600 ends. If, however, the seek complete operation 614 determines that the seek operation is complete, the operation flow continues to a saturation latch bit determination operation 618.

The saturation latch bit determination operation 618 determines if the saturation latch bit is set to indicate that transconductance amplifier saturation occurred during the seek. If the saturation latch bit determination operation 618 determines that the saturation latch bit is set to indicate that transconductance amplifier saturation occurred during the seek, the operational flow 600 ends. If, however, the saturation latch bit determination operation 618 determines that the saturation latch bit has not been set to indicate that transconductance amplifier saturation did not occur during the seek, a driving current increase operation 620 then raises the limit on the maximum driving current that may be produced by the transconductance amplifier.

In one embodiment, the driving current increase operation 620 sets the maximum driving current according to the equation increased_max_current=previous_max_current+K/2, where increased_max_current is the new value of maximum driving current that is to be set by the driving current increase operation 620, previous_max_ current is the previously set value of maximum driving current. As described above, K is a numerical constant. It will be understood that constants other than K may be used. For example a constant not related to K, or computed in a different manner than K may be used.

In one embodiment, the driving current increase operation 620 sets the maximum current indicator within the transconductance amplifier, which defines the maximum current that should be output by the transconductance amplifier, as described above. During disc drive operation, the maximum current indicator will then be changed, when and if appropriate, by the driving current increase operation 620.

In alternative embodiments, the driving current increase operation 620 may increase the maximum driving current produced by the transconductance amplifier in other ways than by setting a maximum current indicator in the transconductance amplifier. For example, and without limitation, the driving current increase operation 620 may adjust future current profiles, such that a driving current is demanded from the transconductance amplifier that is greater than the current previously demanded from the transconductance amplifier. In another alternative, the driving current increase operation 620 may use other mechanisms, such as increasing the limit for a slew rate limiter that affects the current produced by the transconductance amplifier.

Following the completion of the driving current increase operation 620, the operational flow 600 will end. At some point before the operation 600 is performed or called again, the saturation latch bit should be de-asserted or unset so that it no longer indicates that the transconductance amplifier is in saturation. This de-assertion of the saturation latch bit will preferably occur before saturation determination operation 608, such as before seek determination 602. Alternatively, the de-assertion of the saturation latch bit may occur after the saturation latch bit determination operation 618 or after the completion of the operational flow 600.

In summary, one embodiment of the present invention may be viewed as a method for optimizing seek operations in a disc drive (such as 100) having an amplifier (such as 216) for supplying a driving current to drive a voice coil motor (such as 124), the driving current supplied to the voice coil motor being limited to a maximum driving current. The method includes, but is not limited to, the steps of determining whether the amplifier saturated during a portion of a seek operation (such as 608) and, if the amplifier saturated during the portion of the seek operation, decreasing the maximum driving current (such as 612). The method may further include the steps of determining whether the seek operation has completed (such as 614) and, if the seek operation has completed, determining whether the amplifier saturated during any portion of the seek operation (such as 618). If the amplifier did not saturate during any portion of the seek operation, the maximum driving current is increased (such as 620).

An additional step that may be included in this embodiment involves determining whether the amplifier saturated during a portion of a seek operation and decreasing the maximum driving current only if the length of the seek operation is greater than a predetermined minimum seek length (such as 606).

Another embodiment may be viewed as a method for adaptive seek control in a disc drive (such as 100) having an amplifier (such as 216) for supplying a maximum driving current to drive a voice coil motor (such as 126), wherein the driving current supplied to the voice coil motor is limited to a maximum driving current. The method includes, but is not limited to, the steps of detecting a servo sample and determining, upon detection of the servo sample, whether a seek operation is being performed (such as 602). If a seek operation is being performed, it is determined whether the length of the seek operation being performed is longer than a predetermined minimum seek length (such as 606). If the length of the seek operation being performed is longer than the predetermined minimum seek length, it is determined as to whether the amplifier saturated during the portion of the seek operation (such as 608). If it is determined that the amplifier saturated during the portion of the seek operation, the maximum driving current is decreased (such as 612).

Additional steps in this embodiment include, but are not limited to, determining whether the seek operation has completed (such as 614) and, if it is determined that the seek operation has completed, increasing the maximum driving current (such as 620).

In this embodiment, the amplifier may included a maximum current indicator that specifies a value of the maximum driving current that will be output by the amplifier. In such a case, the step of decreasing the maximum driving current (such as 612) may be accomplished by decreasing the value of the maximum current indicator. Similarly, if the amplifier includes a maximum current indicator the step of increasing the maximum driving current (such as 612) may be accomplished by increasing the value of the maximum current indicator.

Additionally, in this embodiment, the step of decreasing the value of the maximum driving current value (such as 612) may be made according to the equation decreased_max_current=previous_max_current−K, where decreased_max_current is the decreased value of the maximum driving current and K is a predetermined constant. Likewise, the step of increasing the value of the maximum driving current value (such as 620) may be made according to an equation increased_max_current=previous_max_current−K/2, wherein increased_max_current is the increased value of the maximum driving current.

Yet another embodiment may be viewed as a system for optimizing the operation of a notch filter (such as 412) in a disc drive (such as 100) by limiting saturation in an amplifier (such as 216). In this embodiment, the disc drive includes a voice coil motor (such as 126), and an amplifier (such as 216) for supplying a maximum driving current to drive the voice coil motor. The driving current supplied to the voice coil motor in this embodiment is limited to a predetermined maximum driving current. Additionally, the system includes a driving current adjustment means (such as 420) for defining the maximum driving current dynamically during drive operation, so as to limit the amount of time the amplifier is saturated.

In this embodiment, the driving current adjustment means may define the maximum driving current by setting a maximum current value stored in a maximum current indicator in the amplifier. In such a case, the driving current adjustment means may perform the steps of determining if the amplifier saturated during a prior portion of a seek operation (such as 608) and decreasing the maximum current value (such as 612) if the amplifier saturated during the portion of the seek operation.

Additionally, in this embodiment, the amplifier may indicate to the driving current adjustment means if the amplifier saturated during the prior portion of the seek operation by setting a bit within the amplifier to indicate that the amplifier is in saturation (such as 610).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, while described in terms of its use in a disc drive, the current control module may be used in any data storage device using a servo control system employing an amplifier to move or position reading and/or writing elements. Numerous other changes may be made which will readily suggest themselves to those skilled in the art and which are encompassed in the spirit of the invention disclosed and as defined in the appended claims.

What is claimed is:

1. A method comprising steps of:
   determining whether a length of a seek operation is longer than a predetermined minimum seek length;
   if it is determined that the length of the seek operation is longer than the predetermined minimum seek length, determining whether an amplifier saturated during the seek operation; and
   if it is determined that the amplifier saturated during the seek operation, adjusting a maximum driving current.

2. A computer-readable medium having computer-executable instructions for performing the steps recited in claim 1.

3. The method of claim 1, further comprising steps of:
   if it is determined that the amplifier did not saturate during the seek operation, determining whether the seek operation has completed; and
   if it is determined that the seek operation has completed, increasing the maximum driving current.

4. The method of claim 1, wherein the adjusting the maximum driving current includes decreasing maximum driving current.

5. The method of claim 1, further comprising a step of:
   if it is determined that the amplifier saturated during the seek operation, asserting a saturation indicator.

6. The method of claim 5, further comprising steps of:
   determining if the seek operation has completed;
   if it is determined that the seek operation has completed, determining if the saturation indicator is asserted; and
   if it is determined that the saturation indicator is not asserted, increasing the maximum driving current.

7. The method of claim 6, wherein the amplifier includes a maximum current indicator that specifies a value of the maximum driving current that will be output by the amplifier, and wherein the decreasing step decreases the maximum driving current by decreasing the value of the maximum current indicator.

8. The method of claim 7, wherein the increasing step increases the maximum driving current by increasing the value of the maximum current indicator.

9. The method of claim 7, wherein the decreasing step decreases the value of the maximum driving current value according to an equation decreased_max_current= previous_max_current−K, wherein decreased_max_current is the decreased value of the maximum driving current and K is a predetermined constant, and wherein the increasing step increases the value of the maximum driving current value according to an equation increased_max_current=previous_max_current−K/2, wherein increased_max_current is the increased value of the maximum driving current.

10. A system for optimizing notch filter operation in a disc drive by limiting amplifier saturation, comprising:
    a disc drive having a voice coil motor, an amplifier for supplying a maximum driving current to drive the voice coil motor, the driving current supplied to the voice coil motor being limited to a predetermined maximum driving current, and a notch filter for modifying a frequency response of the drive current; and
    a driving current adjustment means for dynamically defining during drive operation the maximum driving current so as to limit the amount of time the amplifier is saturated.

11. The system of claim 10, wherein the driving current adjustment means defines the maximum driving current by setting a maximum current value.

12. The system of claim 11, wherein the maximum current value is stored in a maximum current indicator in the amplifier.

13. The system of claim 12, wherein the driving current adjustment means performing steps of:
    (a) determining if the amplifier saturated during a prior portion of a seek operation; and
    (b) if the amplifier saturated during the portion of the seek operation, decreasing the maximum current value.

14. The system of claim 13, wherein the driving current adjustment means further performs steps of:
    (c) determining if the seek operation has completed; and
    (d) if it is determined that the seek operation has completed, increasing the maximum current.

15. The system of claim 13, wherein the amplifier indicates to the driving current adjustment means if the amplifier saturated during the prior portion of the seek operation.

16. The system of claim 15, wherein the amplifier indicates to the driving current adjustment means if the amplifier saturated during the prior portion of the seek operation by setting a bit within the amplifier to indicate that the amplifier is in saturation.

17. The system of claim 16, wherein the seek operation has a length and wherein the driving current adjustment means performs determining step (a) and decreasing step (b) only if the length of the seek operation is longer than a predetermined minimum seek length.

18. A method comprising the steps of:
    generating a filtered motor signal to control a motor;
    amplifying the filtered motor signal so that the filtered motor signal has substantially an intended effect;
    determining whether the amplifying step saturated during a seek operation; and
    if the amplifying step saturated during the seek operation, decreasing a maximum driving current.

19. The method of claim 18, wherein the seek operation has a length and wherein determining step and decreasing step are performed only if a length of the seek operation is greater than a predetermined minimum seek length.

20. The method of claim 18, further comprising steps of:
    determining whether the seek operation has completed;
    if the seek operation has completed, determining whether the amplifying step saturated during any portion of the seek operation; and
    if the amplifying step did not saturate during the seek operation, increasing the maximum driving current.

21. The method of claim 20, further comprising step of:
    if the amplifying step saturated during the portion of the seek operation, asserting a saturation indicator.

22. The method of claim 21, where the determining step comprises checking the saturation indicator to determine if the amplifying step did not saturate during the seek operation.

23. The method of claim 20, wherein the amplifying step uses an amplifier that includes a maximum current indicator that specifies a value of the maximum driving current that will be output by the amplifier, and wherein the decreasing step decreasing the maximum driving current by decreasing the value of the maximum current indicator.

24. The method of claim 23, wherein the increasing step increases the maximum driving current by increasing the value of the maximum current indicator.

25. The method of claim 24, wherein the decreasing step decreases the value of the maximum driving current indicator according to an equation decreased_max_current= previous_max_current−K, wherein decreased_max_current is the decreased value of the maximum driving current and K is a predetermined constant.

26. The method of claim 25, wherein the increasing step increases the value of the maximum driving current indicator according to an equation increased_max_current= previous_max_current−K/2, wherein increased_max_current is the increased value of he maximum driving current.

* * * * *